June 20, 1939.   F. PLÖTZ   2,163,496
PERMANENT MAGNET DYNAMO-ELECTRIC MACHINE
Filed Oct. 15, 1937
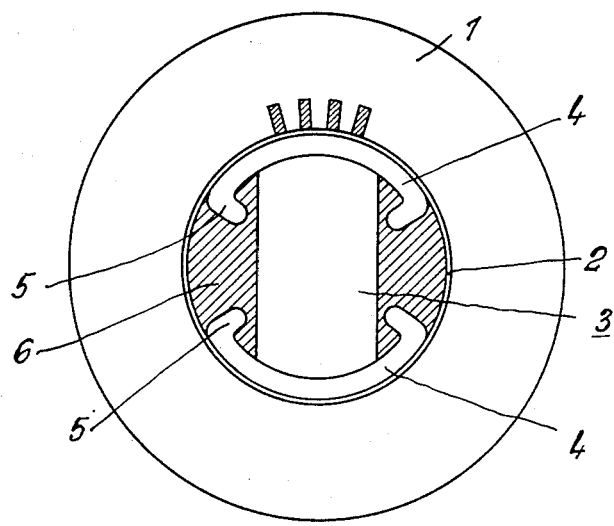
INVENTOR.
Feodor Plötz
BY Stephen Cerstvik
ATTORNEY.

Patented June 20, 1939

2,163,496

UNITED STATES PATENT OFFICE 2,163,496

PERMANENT MAGNET DYNAMO-ELECTRIC MACHINE

Feodor Plötz, Berlin, Germany, assignor to Siemens Apparate und Maschinen Gesellschaft mit beschränkter Haftung, Berlin, Germany, a corporation of Germany Application October 15, 1937, Serial No. 169,260
In Germany October 26, 1936

2 Claims. (Cl. 171—209)

The present invention relates to improvements in electric machines having a permanent magnet system. When such machines are operated at considerable speeds, considerable iron losses, which appreciably impair the efficiency of the machine and produce undue heating, are caused in the permanent magnet, particularly owing to the slots arranged in the iron rotor lying opposite the permanent magnet.

According to the present invention this drawback is removed by the fact that the permanent magnets, contact at their ends opposite to the air gap, with laminated soft iron parts which so to say form pole pieces and which are firmly held in position by sprayed or cast filling material surrounding the poles. In this case it is essential that the laminated soft iron parts forming the pole pieces are not integrally secured to the permanent magnets. Consequently, in this arrangement the laminated pole pieces in the direction of the flux traversing the same may be made of particularly small dimensions.

A further great advantage of this arrangement lies in the fact that a machining of the permanent magnets is avoided which would otherwise be very difficult to perform.

In the accompanying drawing the present invention is shown as applied to a direct-current motor for very high speeds; for instance, for driving gyroscopes.

1 denotes the slotted outer rotor of the machine which carries the armature winding secured to the commutator. In the bore 2 of the outer rotor is arranged the inner stator 3 which forms a permanent magnet. 4 denotes the laminated soft iron parts or pole-shoes whose laminations lie side by side in the direction of the axis of the machine. These laminations are firmly held by radially directed lugs 5, embedded in the filling bodies 6 which lugs, upon a shrinking of the sprayed material ensure proper alignment and firm contact between the permanent magnet and the soft pole pieces. The filling material consists of cast-in or sprayed-in metal, of pressed material or the like of non-magnetic material. These filling bodies which form cylindrical sections have, furthermore, the function to fill up fairly large voids in the interior of the machine in order to reduce as far as possible the windage losses to a minimum. The invention is not limited to the embodiment shown, but it may also be applied to alternating-current machines. The parts serving to support the magnet system may be advantageously secured directly to the filling pieces 6. In other words, the filling material is in intimate and close contact with the pole shoes so that upon cooling and shrinkage of the filling material the pole-shoes are held firmly against the permanent magnets.

The magnet is manufactured preferably as follows: The permanent magnets and the soft iron parts are jointly placed in a mold; whereupon the filling bodies are made by spraying or casting filling material into the mold.

What is claimed is:

1. The method of manufacturing the rotor of a dynamo-electric machine including a permanent magnetic element with radial polar projections and individual soft-iron pole pieces having protuberances on the opposite ends thereof, which method comprises placing the permanent magnetic element in a mold with the polar projections emanating radially from the center of said element, locating an individual pole piece adjacent the face of each of said radially emanating projections, with the protuberances of said pole pieces pointed towards the center of said element, and pouring a non-magnetic filling-material about said magnetic element and pole pieces flush with the peripheries thereof whereby, upon solidification and contraction of said material, said pole pieces are held in a solid cylinder and in properly aligned position firmly against the faces of said projections.

2. In a dynamo-electric machine, a permanent magnet having polar projections extending from the center thereof, individual soft-iron pole-shoes each abutting the face of one of said projections and in contact with said projection at said face only, protuberances at the extremities of said pole-shoes extending radially toward said center, and cast filling-material surrounding the sides of said polar projections and surrounding said protuberances whereby each of said pole-shoes is firmly held in properly aligned position in abutting relation with the respective face only of said projections.

FEODOR PLÖTZ.